United States Patent [19]
Sato et al.

[11] 3,811,545
[45] May 21, 1974

[54] CLUTCH DISC WITH FRICTION AND RESILIENT DAMPERS

[75] Inventors: Kiyoomi Sato; Takashi Ishidera, both of Toyota, Japan

[73] Assignee: Toyota Jidosha Kogyo Kabushiki Kaisha, Toyota-shi, Aichi-ken, Japan

[22] Filed: Feb. 15, 1972

[21] Appl. No.: 226,621

[30] Foreign Application Priority Data
Feb. 19, 1971 Japan.................................. 46-7829

[52] U.S. Cl. .......................................... 192/106.1
[51] Int. Cl. .......................................... F16d 3/14
[58] Field of Search...................... 192/106.1, 106.2

[56] References Cited
UNITED STATES PATENTS

| | | | |
|---|---|---|---|
| 2,291,405 | 7/1942 | Nutt................................. | 192/106.2 |
| 3,327,820 | 6/1967 | Maurice....................... | 192/106.2 X |
| 3,362,194 | 1/1968 | Bertelson et al............. | 192/106.2 X |
| 2,234,443 | 3/1941 | Macbeth.......................... | 192/106.1 |

*Primary Examiner*—Benjamin W. Wyche
*Attorney, Agent, or Firm*—Stevens, Davis, Miller & Mosher

[57] ABSTRACT

In a friction clutch disc having damper members for resiliently connecting a driving member and a driven member, a means for changing the friction between said two members in accordance with the relative torsional displacement between said two members.

1 Claim, 49 Drawing Figures

TORSIONAL TORQUE
: POSITIVE

TORSIONAL TORQUE : NEGATIVE

TORSIONAL TORQUE
: POSITIVE

TORSIONAL TORQUE : NEGATIVE

TORSIONAL TORQUE
: POSITIVE

TORSIONAL TORQUE : NEGATIVE

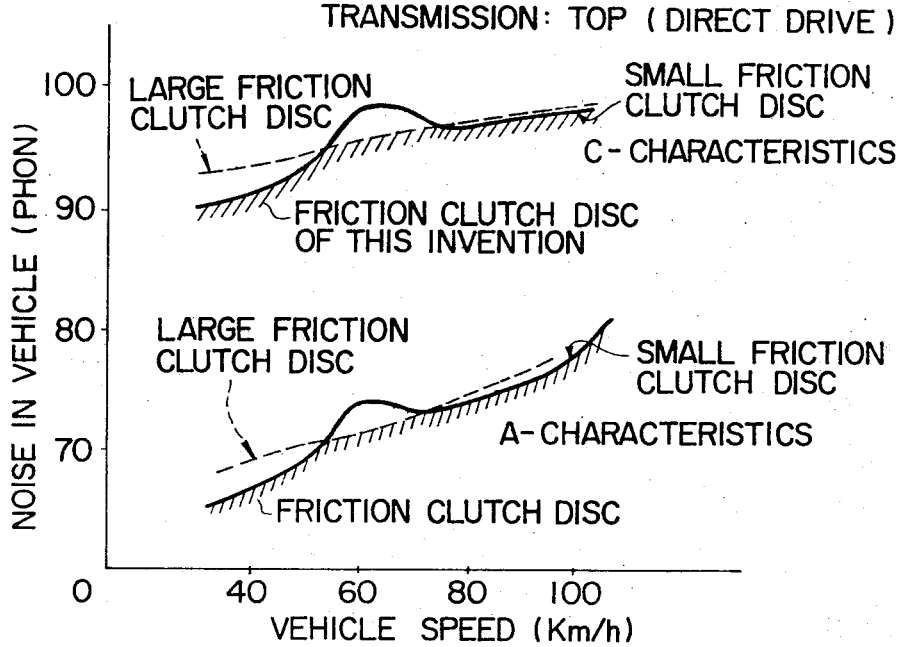
FIG. 48 NOISE LEVEL IN VEHICLE IN FULL LOAD ACCELERATION
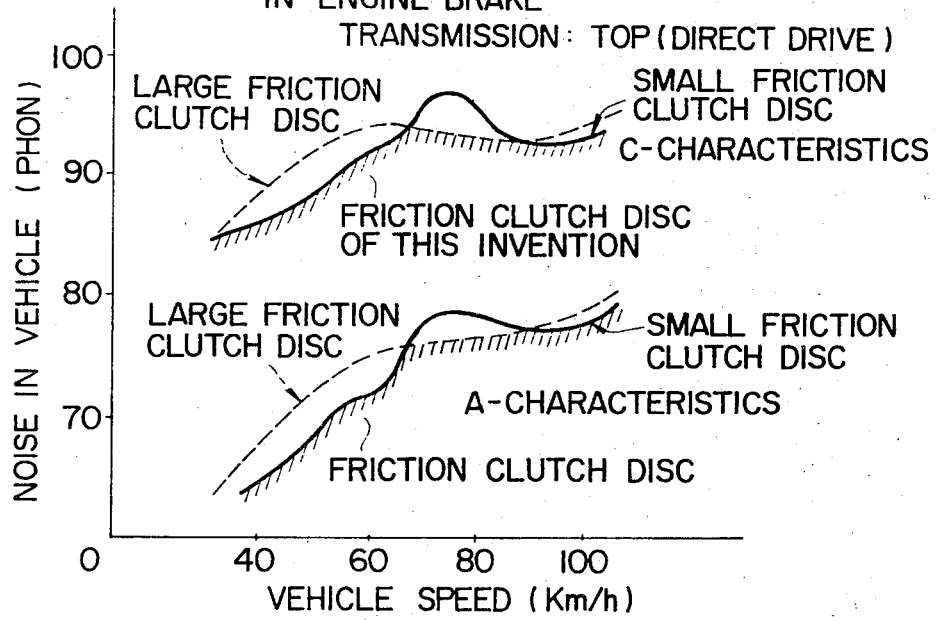
FIG. 49 NOISE LEVEL IN VEHICLE IN ENGINE BRAKE 3,811,545

CLUTCH DISC WITH FRICTION AND RESILIENT DAMPERS

BACKGROUND OF THE INVENTION

This invention relates to a method and a mechanism for reducing noise in a vehicle by controlling the friction characteristics in the automotive drive line system, for example, in power plant-drive line systems of the front engine and rear drive type in which driving power is delivered from the engine to the wheels through the clutch, transmission and final reduction gear, and more particularly by controlling the friction characteristics of the clutch disc of such systems.

Generally, in conventional small and medium sized automobiles, development of torsional resonance in the driving system is one of major causes of noise (unpleasant booming sounds, rattling sounds of transmission gears, etc.) in a vehicle at low or medium running speed.

In order to eliminate these drawbacks, conventional automotive clutches incorporate friction damper members of constant torque in their clutch discs for absorbing unnecessary vibration energy by friction through a slight increase of their hysteresis characteristics, thus suppressing the development of vibration and noise. Although from the standpoint of preventing vibration and noise it is desirable to have larger hysteresis characteristics at certain vehicle speeds, such characteristics produce adverse results at other vehicle speeds. In addition, such characteristics may produce adverse results when a vehicle is operated in an engine braking mode, though they are advantageous at the time of acceleration. Consequently, the conventional methods utilizing friction dampers of constant torque cannot effectively prevent the development of noise in a vehicle due to the torsional resonance of the power plant-drive line system. In other words, it means that larger hysteresis in the clutch disc (friction) is more advantageous for reducing noises developed at the torsional resonance frequency of the power plant-drive line system (usually, 60 to 70 Hz in small and medium sized automobiles) on which the torsional characteristics of the clutch disc have a great influence, but that such larger hysteresis produces adverse results for reducing noises in other frequency ranges due to the increase of the torque transmitted into the drive line.

The above-described relations will be described with reference to FIGS. 1 through 3.

In FIG. 1, the construction of an automotive friction clutch disc, to which this invention is applied, is illustrated by utilizing a simple vibration model. In this figure, the notations have the following meanings:

Tm: Forced (input) torque from engine
Tt: Output torque
I: Polar moment of inertia of clutch disc
K: Torsional stiffness of clutch disc
r: Viscous friction of clutch disc
c: Coulomb's friction of clutch disc "r" is developed in the damper members. "c" is developed as the result of plate friction between the outer circumference of the clutch hub and two plates, or between the damper seats and the openings.

FIG. 2 illustrates a case where the Coulomb's friction (c) and viscous friction (r) are simultaneously applied to the model shown in FIG. 1, by replacing such frictions with the equivalent viscous friction. In this case, the equivalent viscous friction ($r'$) is determined by the following equation:

$$r' = 4c/\rho\pi W + r$$

where, $\rho$ : torsional angular displacement.
In this case, the torque transmission rate ($T_F$) is expressed as follows:

$$T_F = Tt/Tm = \sqrt{1 + 4\zeta^2 U^2 / 4\zeta^2 U^2 + (1-U^2)^2}$$

however, $\zeta = r'/2 \sqrt{IK}$ , $U = W/Wn$ , $Wn = \sqrt{K/I}$
where, $\zeta$ : damping ratio
U : frequency ratio
W : circular frequency of engine input
Wn : natural frequency of clutch The relationship between the torque transmission rate ($T_F$) and frequency ratio (U) based on the above-mentioned equations is illustrated in FIG. 3.

As is apparent from these explanatory drawings, the torque transmission ratio ($T_F$) tends to be flat when the damping ratio ($\zeta$) is increased. When the damping ratio is increased, a clutch disc having larger friction will reduce the torque transmission at and around the torsional resonance point on which the torsion characteristic of the clutch disc has a great influence. This clutch disc is quite advantageous for such phenomena as booming sounds or rattling sounds of transmission gears. However, for phenomena to be caused at the points apart from the torsional resonance point, the torque transmission rate ($T_F$) is increased more than in the case of a small damping ratio, thus increasing booming sounds. This means that there exist various torsional resonance points and bending resonance points in the power plant-drive line systems of vehicles in addition to the above-described torsional resonance point on which the torsion characteristics of the clutch disc have a great influence. The vibration phenomena at these torsional resonance points and bending resonance points are transmitted to the vehicle body and produce unpleasant booming sounds. Consequently, when the torque transmission rate is increased, these resonances are accordingly increased and transmitted to the vehicle body. Moreover, the vibration phenomenon due to the torsional resonance of the power plant-drive line system is significantly developed, especially at the time of engine braking.

On the other hand, the conventional methods having friction damper members of constant torque in the clutch disc, cannot sufficiently reduce noise in a vehicle. In addition to the above-described method, such a method has been proposed wherein the braking torque of the friction damper is increased in proportion to the torsional angle of the clutch. However, similar to the above-described constant-type clutch disc, this method cannot fundamentally and satisfactorily reduce vibration noise. The problem of reducing noise still leaves much to be desired.

SUMMARY OF THE INVENTION

The object of this invention is to solve the above-described drawbacks, and more particularly to provide an automotive clutch disc of a simple construction by which vibration noises can be fundamentally and effectively reduced. In an automotive clutch disc comprising a driven member comprising a clutch hub fitted into a rotation shaft, and a flange integrally defined at the outer circumference of said clutch hub, and having a plurality of openings, a driving member comprising a sub-disc plate having openings corresponding to said flange openings and a disc plate having clutch facings mounted thereon, both of said plates are arranged near said flange at both sides thereof and are connected by means of stopper pins, and damper members are interposed between said two plates and flange openings to connect said driven and driving members, thus developing the friction between said two members. This invention is one of its aspects provides a method of preventing noises in a vehicle due to such an automotive friction clutch disc characterized in that the friction between the driving and driven members can be greatly reduced in accordance with the relative torsional angular displacement between said two members at the time of such torque transmission when noises in a vehicle become excessive due to the friction between said two members.

In another of its aspects, this invention provides a mechanism for preventing noises in a vehicle due to such an automotive friction clutch disc characterized in that members having a projection to be brought into contact with damper seats of the damper members for developing friction are provided integrally with said driven member at appropriate positions thereof, thus greatly reducing the friction between said two members through the contact of the damper seats with the projections in accordance with the relative torsional angular displacement between said two members at the time of such torque transmission when noises in a vehicle become excessive due to the friction between said two members.

In still another of its aspects, this invention provides a mechanism for preventing noise from said automotive friction clutch disc characterized in that members having a projection to be brought into contact with flange apertures corresponding to said stopper pins for developing friction are provided integrally with said driving member at appropriate positions thereof, thus greatly reducing the friction between said two members through the contact of said flange apertures and the projections in accordance with the relative torsional angular displacement between said two members at the time of such torque transmission when noise in a vehicle becomes excessive due to the friction between said two members.

BRIEF DESCRIPTION OF THE DRAWINGS

In the accompanying drawings:

FIGS. 48 and 49 illustrate the effects of this invention.

DESCRIPTION OF PREFERRED EMBODIMENTS

Figure 1:
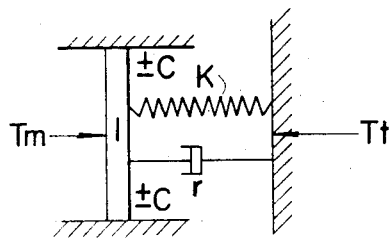
FIG. 1 is an explanatory diagram illustrating the construction of a clutch disc by using a simple vibration model.
Figure 2:
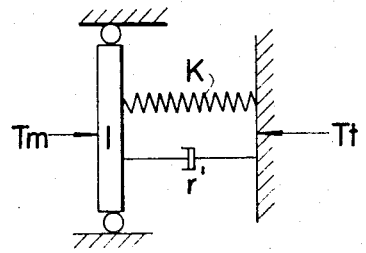
FIG. 2 is an explanatory diagram in which the Coulomb's friction is replaced with the equivalent viscous friction.
Figure 3:
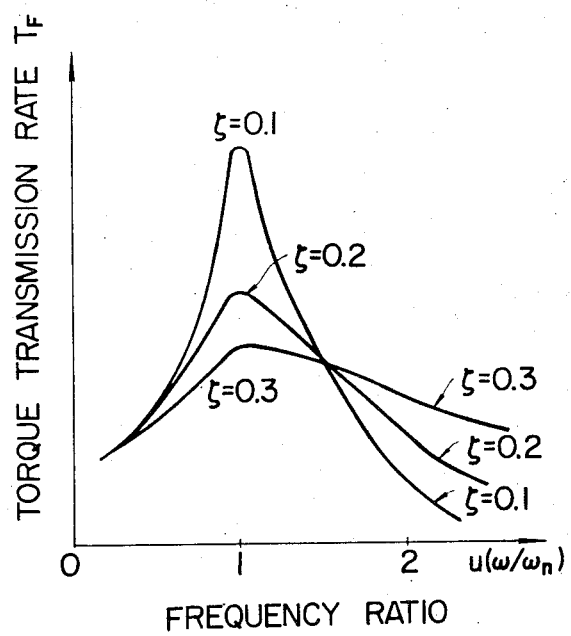
FIG. 3 is an explanatory chart illustrating the torque transmission rate in the vibration model of FIG. 2.
Figure 4:
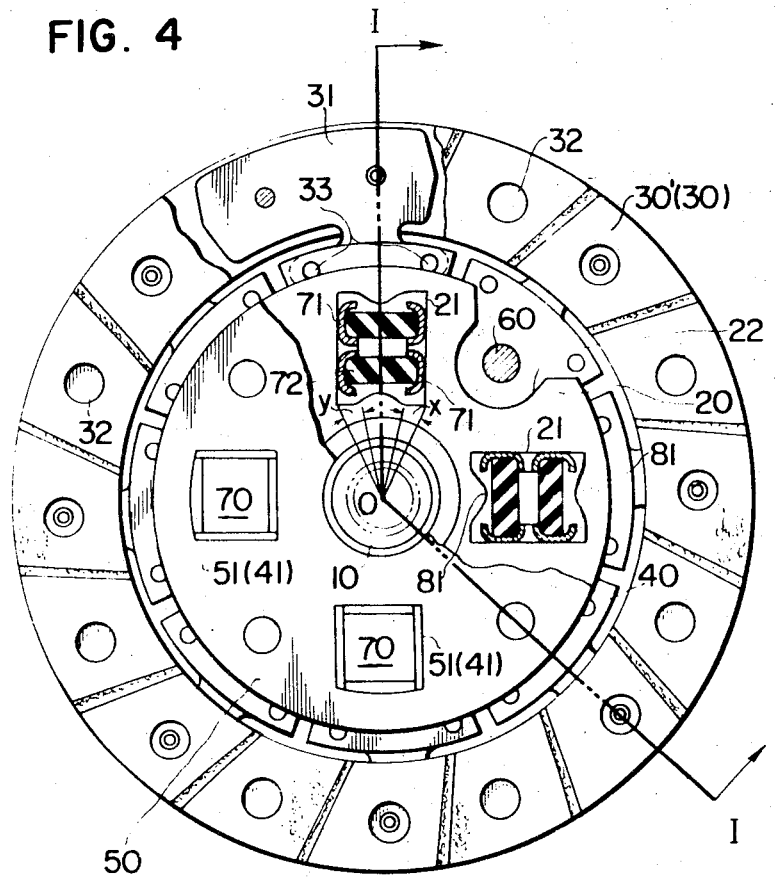
FIG. 4 is a plan view, partly broken away, illustrating an embodiment of this invention.
Figure 5:
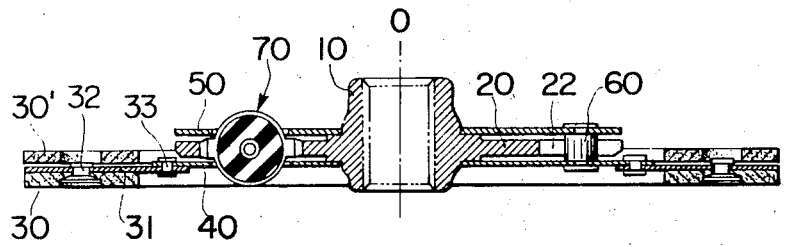
FIG. 5 is a cross-sectional view taken along the line I—I of the embodiment of FIG. 4.

In FIGS. 4 and 5, the reference numeral 10 identifies a clutch hub which is attached to a rotating shaft (not shown) by means of splines. A disc-shaped flange 20 having a plurality of openings 21 (four openings in FIG. 4) is integrally formed at the outer circumference of said clutch hub 10. A driven member is constituted by said clutch hub 10 and flange 20.

The reference numerals 30 and 30' identify clutch facings. Disc springs 31 are interposed between said clutch facings. The clutch facings 30, 30' are secured to the disc springs 31 by means of rivets 32. Furthermore, said disc spring 31 is installed near the outer circumference of a disc plate 40 by means of rivets 33. Said disc plate 40 is provided with openings 41 corresponding to said flange openings 21. The reference numeral 50 designates a sub-disc plate which is provided with openings 51 in tee same manner as the disc plate 40. Said disc plate 40 with the clutch facings 30 and 30' mounted thereon and the sub-disc plate 50 are located near the flange 20 on both sides thereof and are integrally connected by means of stopper pins 60, thus constituting a driving member.

Damper members 70 are disposed at the openings of said plates 40, 50 and flange 20. The driving member is resiliently connected to the driven member by means of said damper members 70, thus causing the both members to make relative motion.

Said damper member 70 comprises a damper seat 71 and an elastic body 72 made of rubber, spring or the like. The flange 20 is provided with apertures 22 at the outer circumference thereof in order that the flange 20 can be engaged with the stopper pins 60 when the relative motion of said driving and driven members reaches a predetermined torsional angular displacemnt.

The above-described construction is the same as that of conventional clutch discs of prior art. However, the embodiments of the invention are characterized by the construction of the openings 21 provided on the flange 20. The openings 21 are constructed so as not to develop contact friction between the damper seats 71 of the damper members 70 abd the openings 21 at the time when the relative torsional angular displacement is smaller than $x$ in the direction of counterclockwise rotation (positive torque) or smaller than $y$ in the direction of clockwise rotation (negative torque) from both ends of the openings 21. Furthermore, members having a projection 81 are integrally provided at the flange 20 of said driven member so that the projection 81 is brought into contact with the damper seat 71 to develop a large contact friction at the time when the relative torsional angular displacement between the driving and driven members exceeds $x$ or $y$. Moreover, the openings 21 are so constructed that they can reliably support the damper members 70.

Other embodiments of this invention will be described hereinbelow with reference to the accompanying drawings. In these embodiments, the same construction as the above-described first embodiment will be identified by the same reference numerals as used in FIGS. 4 and 5, and the detailed description of such construction will be omitted. As the construction on the side of the disc plate 40 is symmetric with that on the side of the sub-disc plate 50, illustration of one of them is omitted in the enlarged explanatory drawings illustrating the successive operating conditions of the embodiments.

Figure 6:
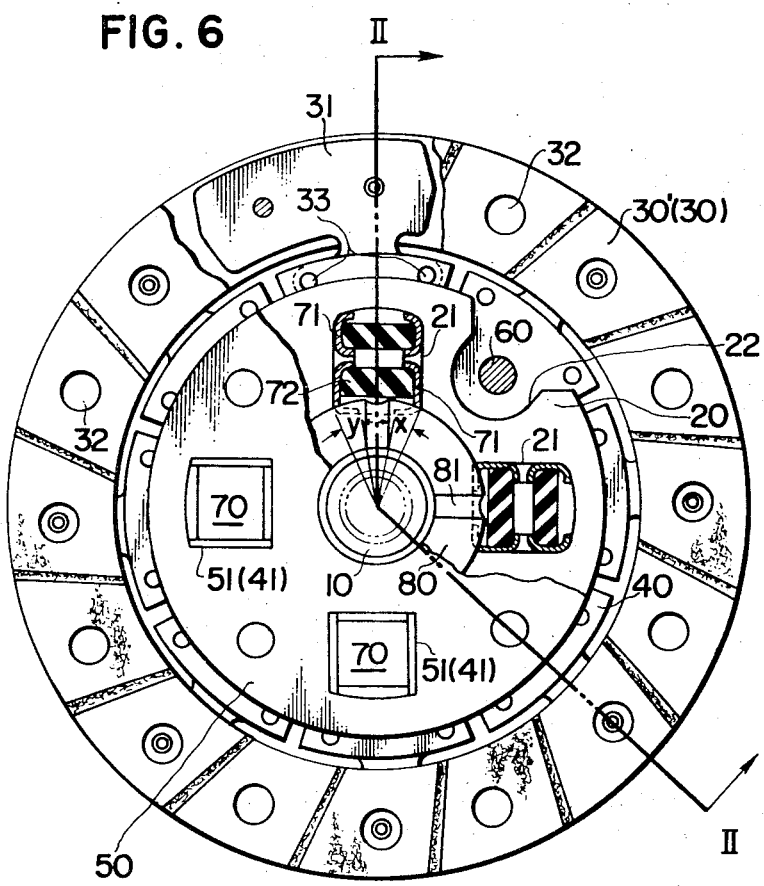
FIGS. 6 and 7 are plan views partly broken away, of the second and third embodiments of this invention, respectively.
Figure 7:
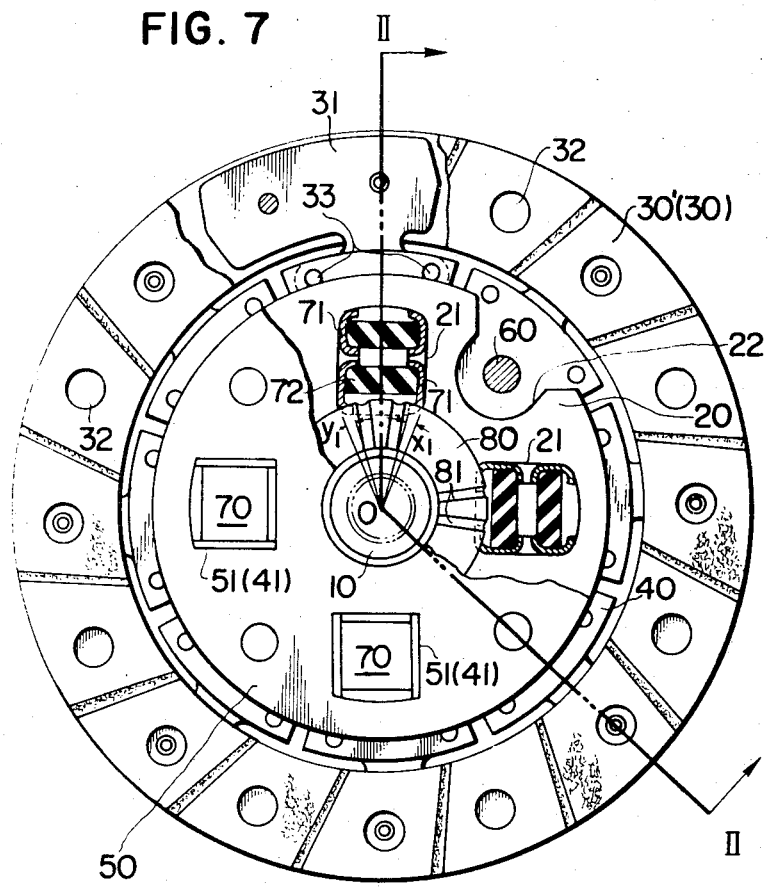
Figure 8:
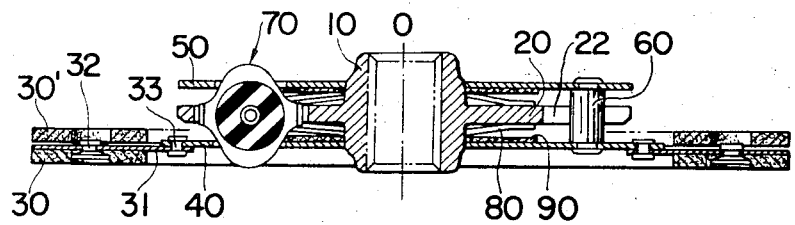
FIG. 8 is a cross-sectional view taken along the line II—II of the embodiments of FIGS. 6 and 7.

FIGS. 6 through 8 illustrate the second and third embodiments of this invention. As shown in FIG. 8, members having the projection(s) 81, that is, friction damper members 80, are integrally attached to the clutch hub 10 of the driven member in the rotational direction by means of splines or any other suitable means between the disc plate 40 and the flange 20 and between the sub-disc plate 50 and the flange 20. Furthermore, friction members 90 (FIG. 8) are provided between said friction dampers 80 and the flange 20. Each friction damper member 80 being used in the second embodiment illustrated in FIG. 6 is provided with the projection 81 which is brought into contact with the damper seat 71 to produce a large friction when the relative torsional angular displacement exceeds $x$ in the direction of counterclockwise rotation (positive torque) and $y$ in the direction of clockwise rotation (negative torque). In the third embodiment shown in FIG. 7, the friction damper member 80 is provided with a set of two projections 81 at the appropriate locations, which are brought into contact with the damper seats 71 when the relative torsional angular displacement exceeds $x_1$ in the direction of counterclockwise rotation (positive torque) and $y_1$ in the direction of clockwise rotation (negative torque), thus producing a large friction. Furthermore, contact of said projections 81 with the damper seats 71 is released when the relative torsional angular displacement is further increased, thus reducing friction.

Figure 9:
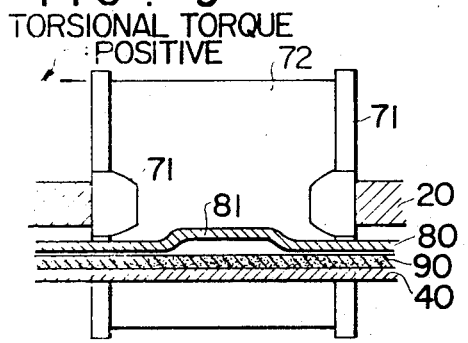
FIGS. 9 through 11 are enlarged explanatory views illustrating the successive operating conditions of the embodiment of FIG. 6.
Figure 12:
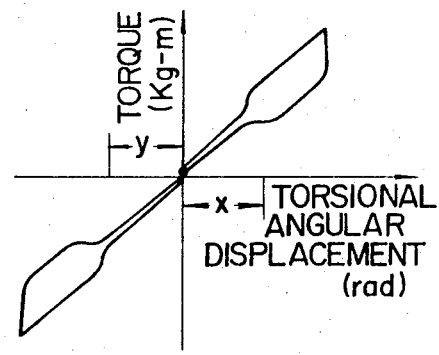
FIGS. 12 through 14 are line diagrams illustrating the static torsional characteristics of the embodiments shown in FIG. 9 through FIG. 11 under each operating condition.
Figure 10:
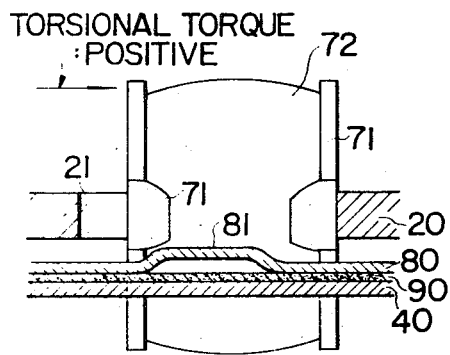
Figure 13:
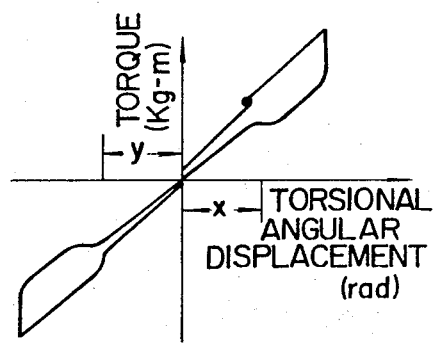
Figure 14:
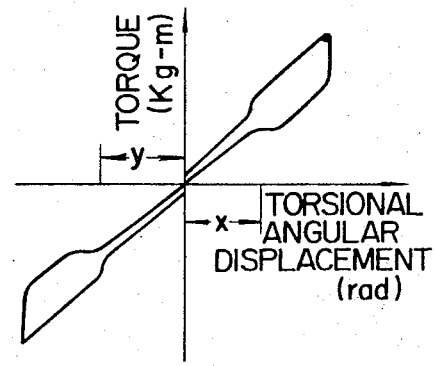

The operation of the first through third embodiments of the above-described construction will be described hereinbelow. As the first embodiment is the same as the second embodiment, the description of the first embodiment will be omitted. The operation of the second embodiment will be described with reference to FIGS. 9 through 11. When a torsional torque is applied between the driving member and the driven member of the clutch disc, said both members develop a relative angular displacement around the center of rotation O. The damper seat 71 is not brought into contact with the projection 81 as shown in FIG. 9 when the above-mentioned torsional torque is small, that is, at the time of the so-called positive torque when power is delivered from the driving member to the driven member of the clutch disc by means of the shaft output torque of the engine, or at the time of the so-called negative torque when the relative torsional angular displacement is smaller than $x$ in case of the counterclockwise rotation in FIG. 6, and power is delivered from the driven member to the driving member, or at the time when the torsional angular displacement is smaller than $y$ in the case of the clockwise rotation in FIG. 6. Accordingly, no appreciable amount of friction is developed between said two members. When this torsional angular displacement exceeds $x$ ($y$), even slightly, the damper seat 71 is brought into full contact with the projection 81 as shown in FIG. 10 and the friction member 90 is strongly pressed against the plates 40 and 50, thus producing a large friction between said two members. (In the first embodiment, contact friction between the damper seat 71 and the projection 81 only is produced). The static torsional characteristics of the clutch disc under the above-described operating conditions are illustrated in FIGS. 12 through 14.

As described above, the first and second embodiments are quite effective in such cases where an adverse effect is developed especially at the time of low torque during acceleration and engine braking because of the increase in the friction between the driving and driven members due to the provision of conventional constant torque type dampers or friction damper members, and especially in such cases where noise in a vehicle becomes excessive due to the friction between said two members, especially at the time of low torque.

Figure 15:
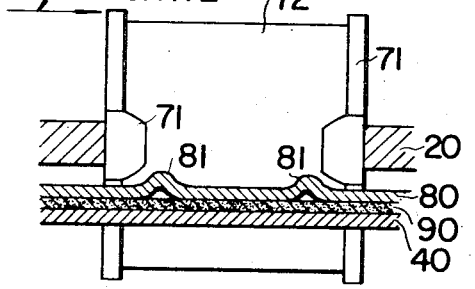
FIGS. 15 through 20 are enlarged explanatory views and line diagrams which are similar to FIGS. 9 through 14.
Figure 18:
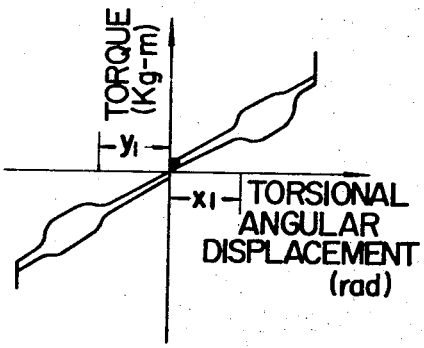
Figure 16:
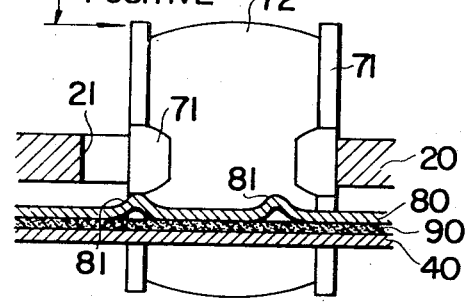
Figure 19:
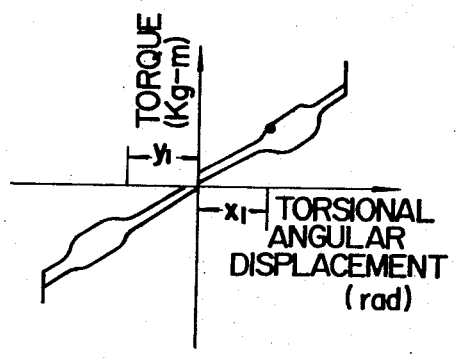
Figure 17:
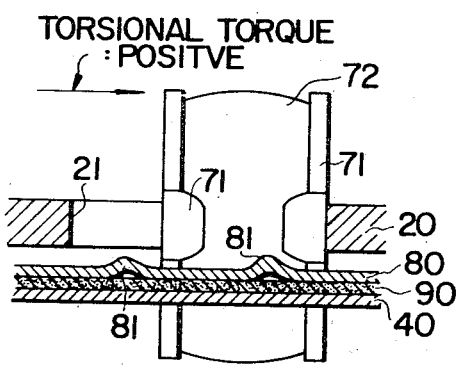
Figure 20:
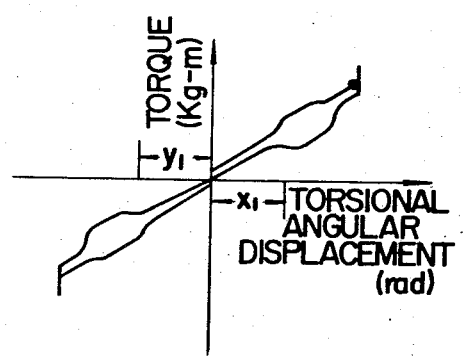

Next, the operation of the third embodiment will be described below. When the relative torsional angular displacement between the driving and driven members of the clutch disc is smaller than $x_1$ or $y_1$, the damper seat 71 is not brought into contact with the projection 81 as shown in FIG. 15, and therefore a large friction is not developed between said two members. When the torsional angular displacement exceeds $x_1$ ($y_1$) even slightly, the damper seat 71 is brought into contact with the projection 81 as shown in FIG. 16, and the friction member 90 is pressed against the plates 40 and 50, thus developing a large friction between these two members. When the torsional angular displacement is further increased, the damper seat 71 goes over the projection 81 as shown in FIG. 17 and there will be no contact of two members. Consequently, a large friction is not developed between said two members. The static characteristics under the operating conditions shown in FIGS. 15 through 17 are illustrated in FIGS. 18 through 20.

As described above, the third embodiment is a quite effective method in such cases where noises in a vehicle become excessive especially at the time of low torque and high torque during acceleration and engine braking due to increase in the friction between said two members.

The fourth through seventh embodiments shown in FIGS. 21 through 35 are adapted to prevent noises more effectively. In these embodiments, apertures are provided at the installing ends of the damper members so as to absorb the torsional resonance of the driving system adequately by decreasing the torsional stiffness of the clutch disc, thus reducing noises in a vehicle. Furthermore, these embodiments are constructed so that adjustment of contact of the damper seat and projection can be facilitated.

Figure 25:
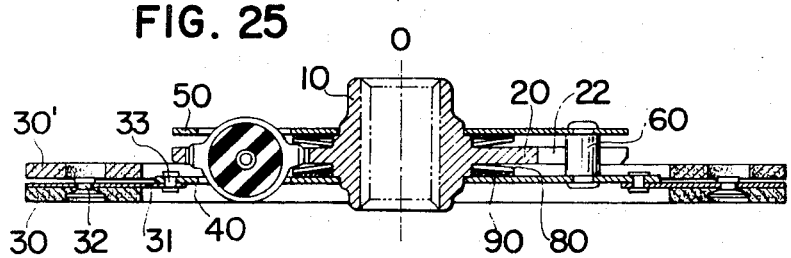
FIG. 25 is a cross-sectional view taken along the line III—III of FIGS. 21 through 24.

As shown in FIG. 25, in the fourth through seventh embodiments, the arrangement of the friction damper members 80 and the friction members 90 is the same as in the above-described second and third embodiments.

Figure 21:
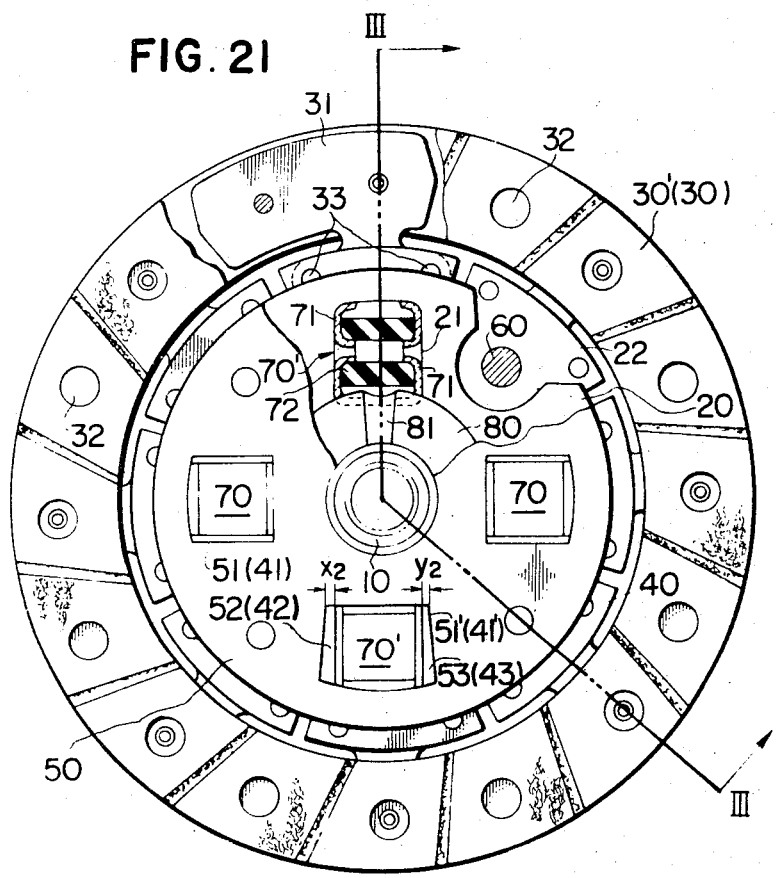
FIGS. 21 through 24 are plan views, partly broken away, of the fourth through seventh embodiments of this invention, respectively.

Referring first to the fourth embodiment illustrated in FIG. 21, notches 52 (42) and 53 (43) are provided at the both sides of a pair of damper members 70'. This will be described in more detail. A pair of damper members 70' is installed in the flange openings 21. The disc plate 40 and the sub-disc plate 50 are provided with openings 41' and 51', respectively, which are larger than said flange opening 21 by $x_2$ in the direction of counterclockwise rotation and by $y_2$ in the direction of clockwise rotation, and the apertures 42, 52 and 43, 53 are provided at both sides of the damper members 70'. Furthermore, the friction damper member 80 is provided with the projection 81 at the position shown in FIG. 21. Said projection 81 is brought into contact with the damper seat 71.

Figure 26:
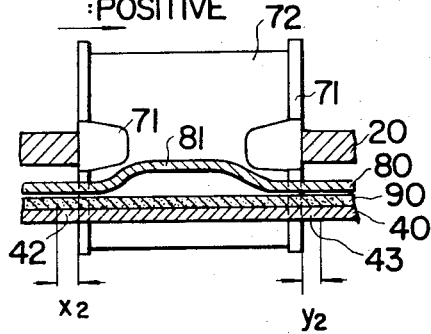
FIGS. 26 through 28 are enlarged explanatory views illustrating the successive operating conditions of the embodiment of FIG. 21.
Figure 27:
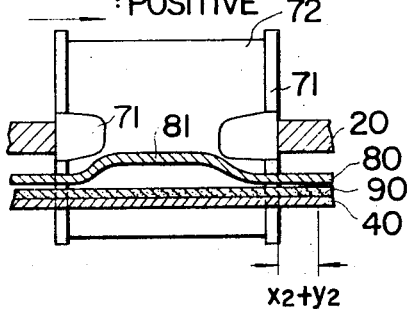
Figure 28:
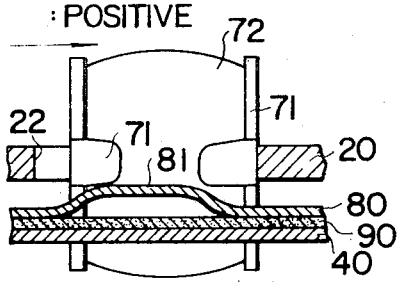
Figure 32:
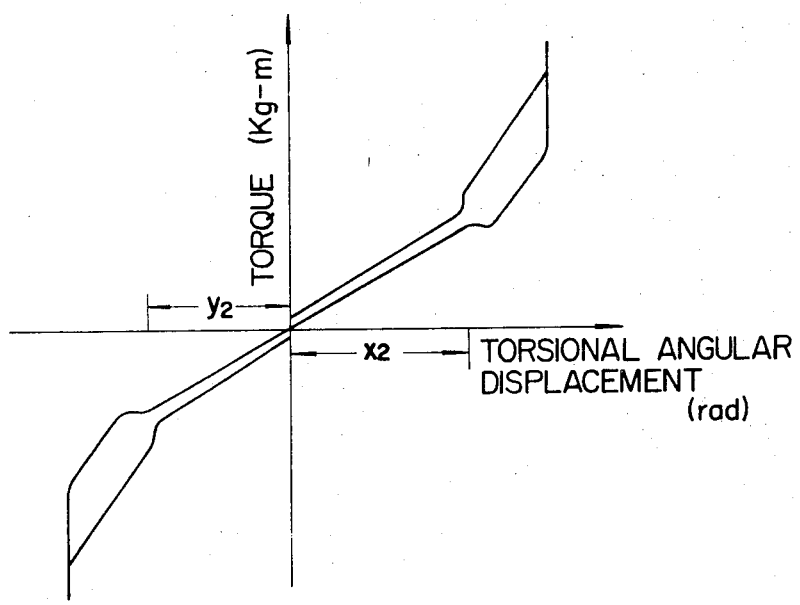
FIGS. 32 through 35 are line diagrams illustrating the static torsional characteristics of the fourth through seventh embodiments of this invention, respectively.

The operation of the fourth embodiment will be described with reference to FIGS. 26 through 28. As shown in FIGS. 26 and 27, a pair of damper members 70' are not operated until the relative torsional angular displacement between the driving and driven members reaches $x_2$ ($y_2$), but only the damper members 70 are operated. Accordingly, a comparatively samll torsional stiffness is obtained. When the relative torsional angular displacement between said two members is further increased, the damper members 70' start to operate and the damper seat 71 is brought into contact with the projection 81, thus developing a large friction between said two members. The static torsional chracteristic under this condition is illustrated in FIG. 32. This embodiment is also effective in the same manner as the first and second embodiments in such cases where noise in a vehicle becomes excessive, especially at the time of low torque during acceleration and engine braking due to increase in the friction between said two members.

Figure 22:
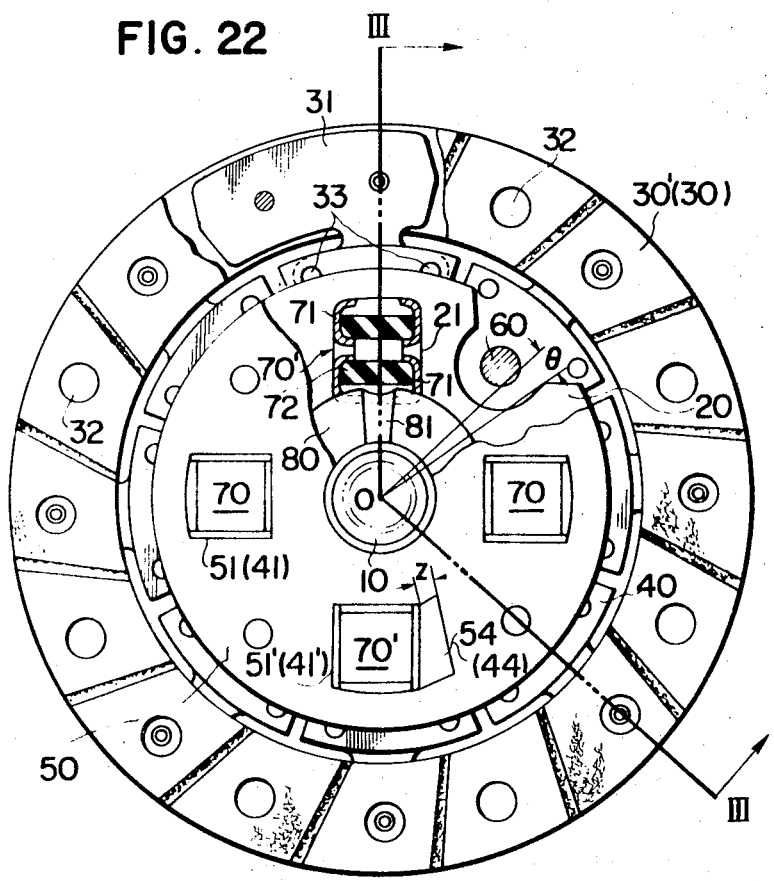

In the fifth embodiment shown in FIG. 22, apertures 54 (44) are provided only at the left side of the damper members 70' which are actuated at the time of engine braking. Said each aperture 54 (44) has a travel space Z larger than the relative torsional angular displacement O to be developed as the stopper torque through the contact of the stopper pins 60 with the flange apertures 22. Thus, noise in a vehicle is prevented by decreasing the torsional stiffness of power plant-drive line systems only in the case of engine braking where noise in a vehicle becomes excessive due to the development of significant torsional resonance of the power plant-drive line system. Furthermore, if friction damper members are incorporated between the driving and driven members to develop the friction between them, the vibration phenomenon due to the torsional resonance of power plant-drive line system at the time of acceleration is improved. However, the coercive force from the engine is increased at the time of engine braking because of the increase in the friction between both members, and therefore noise in a vehicle (booming sounds) will become excessive. The fifth embodiment is quite advantageous in the above-described cases.

In the fifth embodiment, as described above, the disc plate 40 and the sub-disc plate 50 are provided with a pair of openings 41' and 51' which are larger than the flange opening 21 by Z in the direction of clockwise rotation. Moreover, the apertures 44 and 54 are defined at the left-hand (counterclockwise) side of a pair of damper members 70'. Furthermore, the friction damper member 80 is provided with the projection 81 at the position illustrated in FIG. 22.

Figure 11:
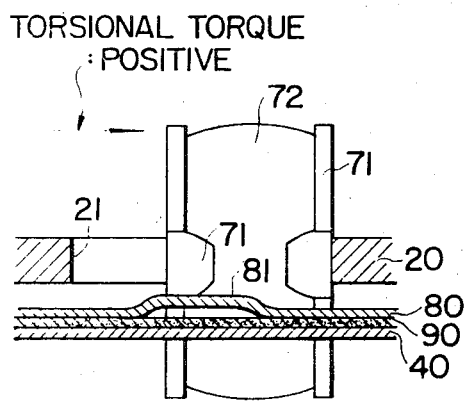
Figure 33:
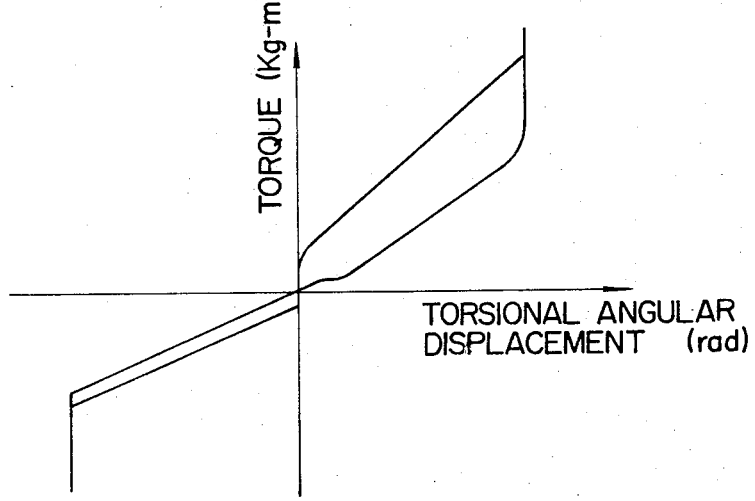

The operation of the fifth embodiment at the time of acceleration (at the time of positive torque) is the same as illustrated in FIGS. 9 through 11. However, at the time of engine braking (at the time of negative torque), a pair of the damper members 70' are not actuated, because each aperture 44 and 54 has a travel space Z larger than the relative torsional angular displacement O which is developed as the stopper torque by the contact of the stopper pins 60 with the flange apertures 22. Consequently, any significant friction is not developed at the time of negative torque. The static torsional characteristic at this time is shown in FIG. 33.

Figure 23:
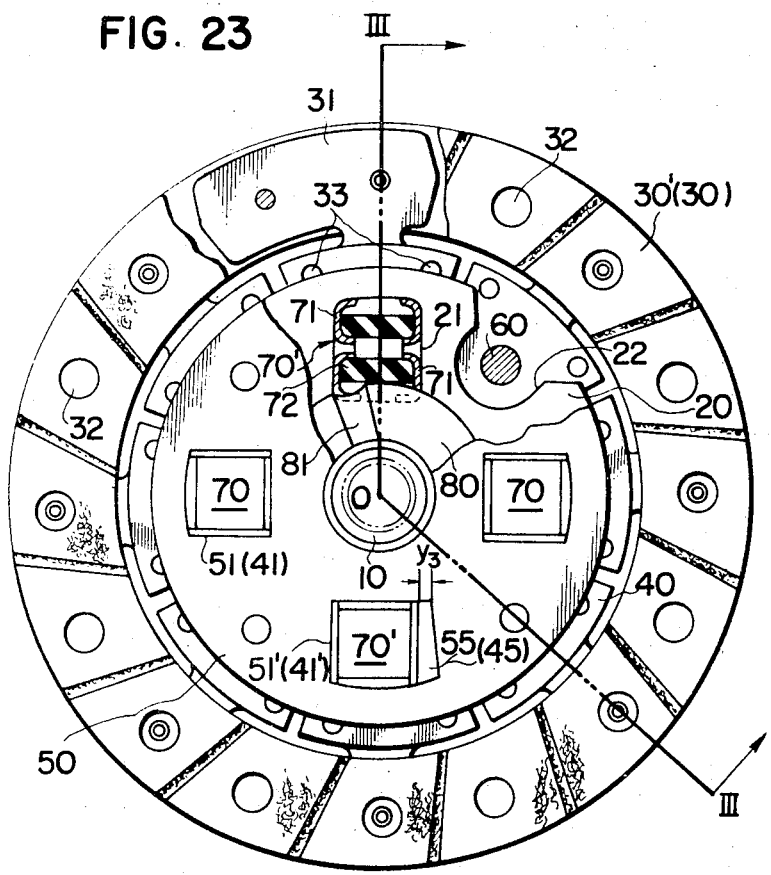
Figure 24:
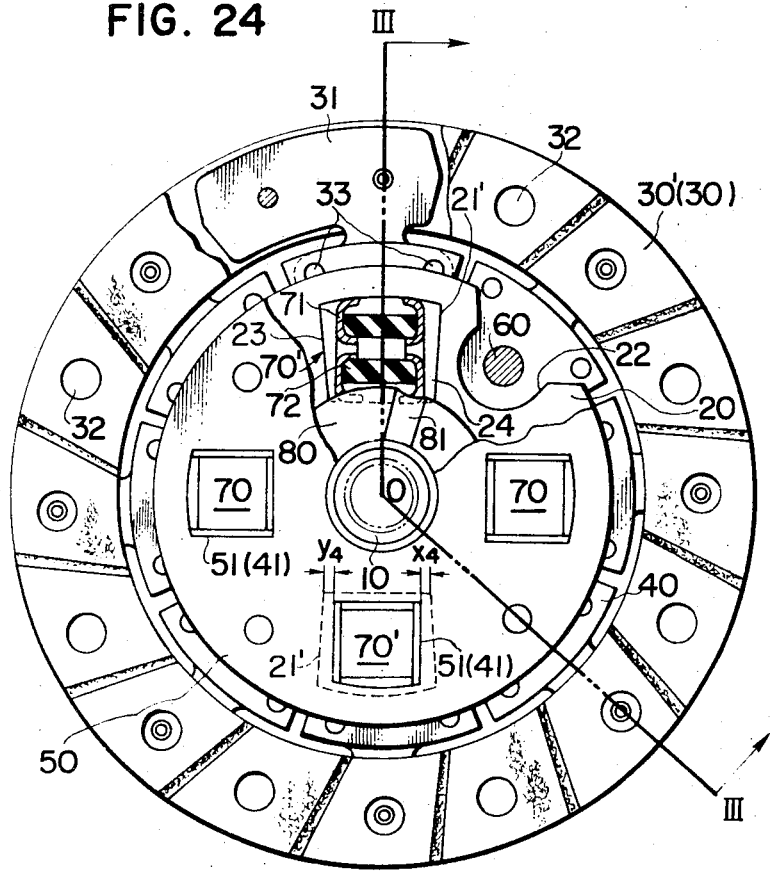
Figure 29:
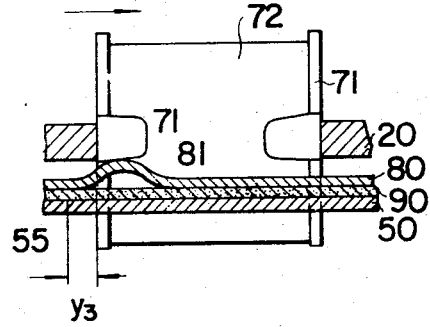
FIGS. 29 through 31 are enlarged explanatory views illustrating the successive operating conditions of the embodiment of FIG. 23.
Figure 30:
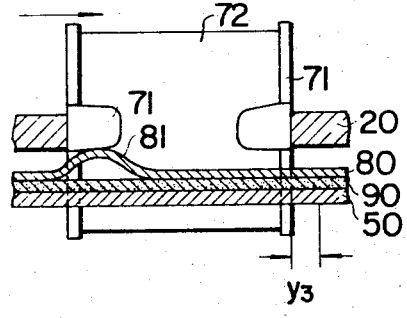
Figure 31:
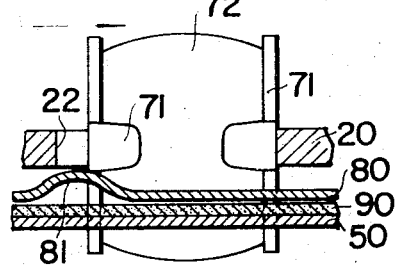
Figure 34:
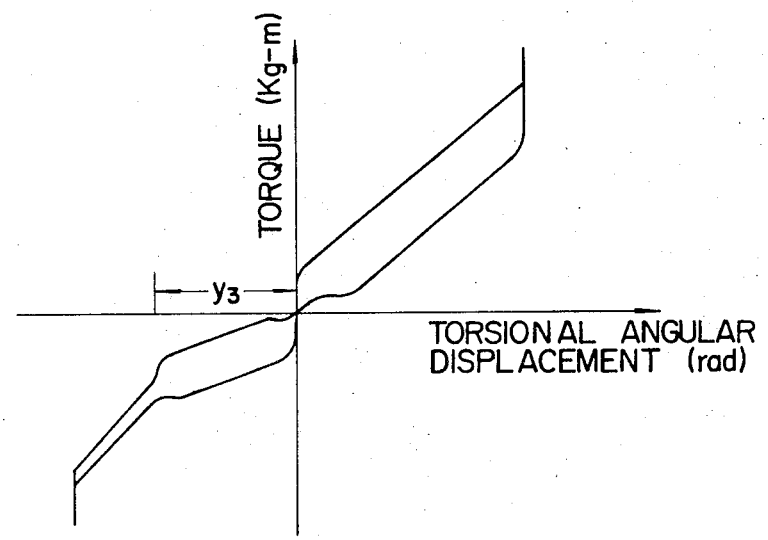
Figure 35:
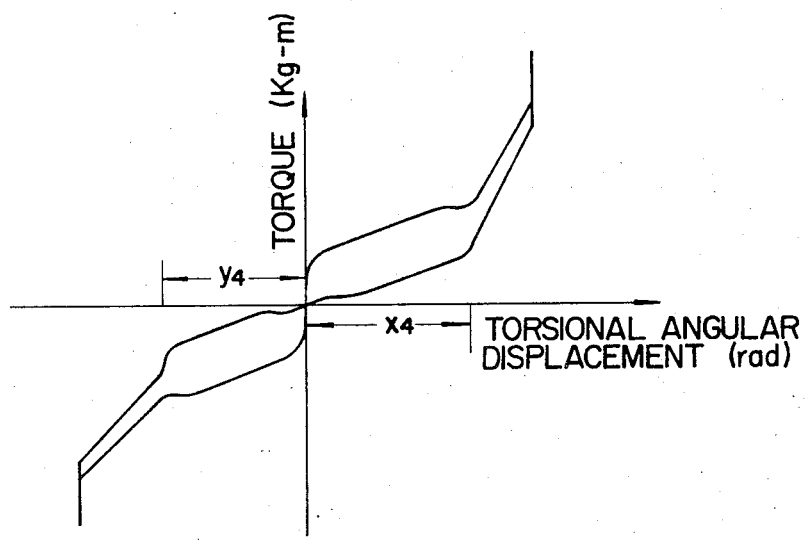

In cases where noise in a vehicle becomes excessive due to increases in the friction between the driving and driven members especially at the time of high torque during engine braking, it is more advantageous to provide a pair of damper members 70' with apertures 55 (45) larger by $y_3$ at the engine braking side thereof as shown in FIG. 23 (sixth embodiment), and to locate the friction damper members 80 at appropriate positions on the driven member so that the damper seats 71 are in contact with the projections 81 from the beginning, thus operating said members as illustrated in FIGS. 29 through 31. In cases where noise in a vehicle becomes excessive, especially at the time of high torque during acceleration and engine braking, it is advantageous to provide the flange 20 with openings 21' which are larger than the openings of the disc plate 41 and the sub-disc plate 51 by $x_4$ and $y_4$ in the both rotational directions as shown in FIG. 24 (seventh embodiment), and to define apertures 23 and 24 at both sides of a pair of damper members 70' and further to locate the friction damper members 80 at appropriate positions on the driven member so that the damper seats 71 are in contact with the projections 81 from the beginning in the same manner as described above. The static torsional characteristics under these conditions are illustrated in FIGS. 34 and 35.

In the above-described embodiments, prevention of noise is accomplished by the contact of the damper seats with the projections in accordance with the relative torsional angular displacement between the driving and driven members. The embodiments illustrated in FIGS. 36 through 47 utilize the flange apertures made at the outer circumference.

Figure 36:
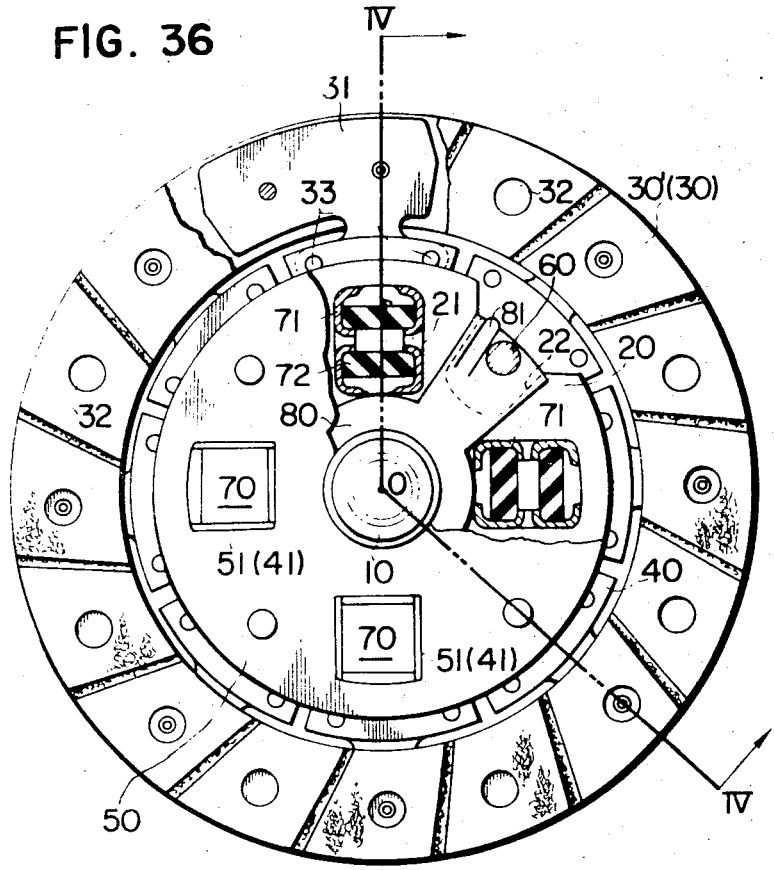
FIG. 36 is a plan view, partly broken away, of the eighth embodiment of this invention.
Figure 37:
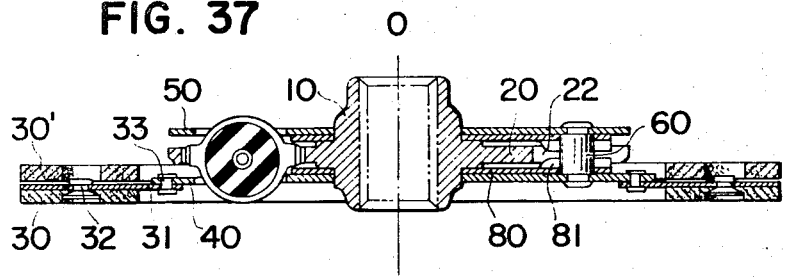
FIG. 37 is a cross-sectional view taken along the line IV—IV of FIG. 36.

The friction damper members 80 of the shape as illustrated in FIG. 36 are disposed between the flange 20 and the disc plate 40 and between the flange 20 and the sub-disc plate 50 as illustrated in FIG. 37. Said members 80 are integrally attached to the plates 40 and 50 of the driving member in the rotational direction by means of the stopper pins 60 or any other suitable means. Each of the friction damper members 80 is provided with one projection 81 at the acceleration side. Said projection is brought into contact with the flange aperture 22.

Figure 38:
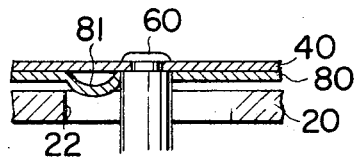
FIGS. 38 through 41 are enlarged explanatory views illustrating the successive operating conditions of the embodiment of FIG. 36.
Figure 39:
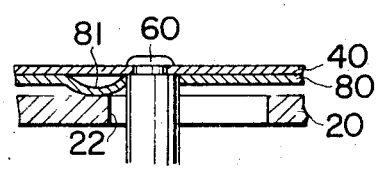
Figure 40:
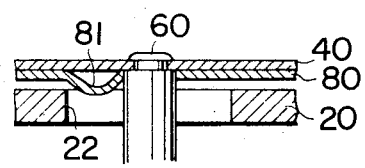
Figure 41:
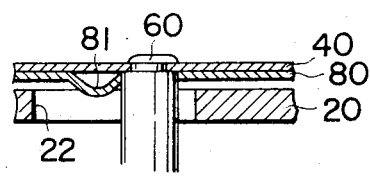
Figure 42:
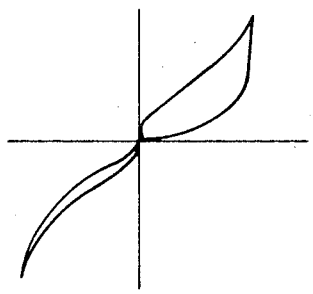
FIG. 42 is a line diagram illustrating the static torsional characteristic of the embodiment of FIG. 36.

This eighth embodiment of the invention is operated as shown in FIGS. 38 and 39 at the time of acceleration, thus developing a large contact friction between both members. At the time of engine braking, the embodiment is operated as shown in FIGS. 40 and 41, thus developing no significant friction between both members. The static torsional characteristics under these conditions are shown in FIG. 42. According to this method, friction can be easily and reliably developed at the time of acceleration only.

Figure 43:
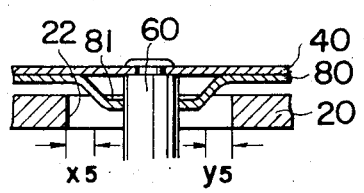
FIGS. 43 and 44 are a view illustrating the principal portion of the ninth embodiment of this invention and a line diagram of the static torsional characteristic of said embodiment, respectively.
Figure 44:
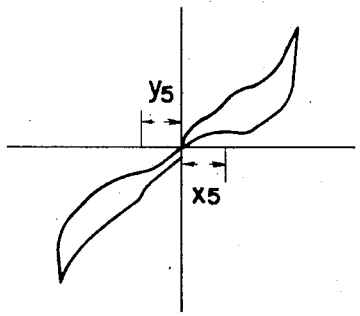
Figure 45:
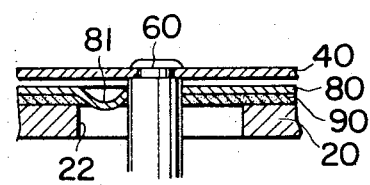
FIG. 45 is a view illustrating the principal portion of the tenth embodiment of this invention.

The ninth embodiment illustrated in FIG. 43 is adapted to develop a large friction between both of said members when the relative torsional angular displacement exceeds $x_5$ at the acceleration (left) side and $y_5$ at the deceleration (right) side. Its torsional characteristics are shown in FIG. 44. In the tenth embodiment shown in FIG. 45, the friction member 90 is interposed between the flange 20 and the friction damper member 80. Thus, the damper member 80 pressing the friction member 90 is pushed toward both plates 40 and 50 by bringing the flange aperture 22 into contact with the projection 81, to thereby greatly decrease the friction between them. In this case, it is necessary that the contact friction between the flange aperture 22 and the projection 81 is smaller than the sliding friction of the friction member 90.

Figure 46:
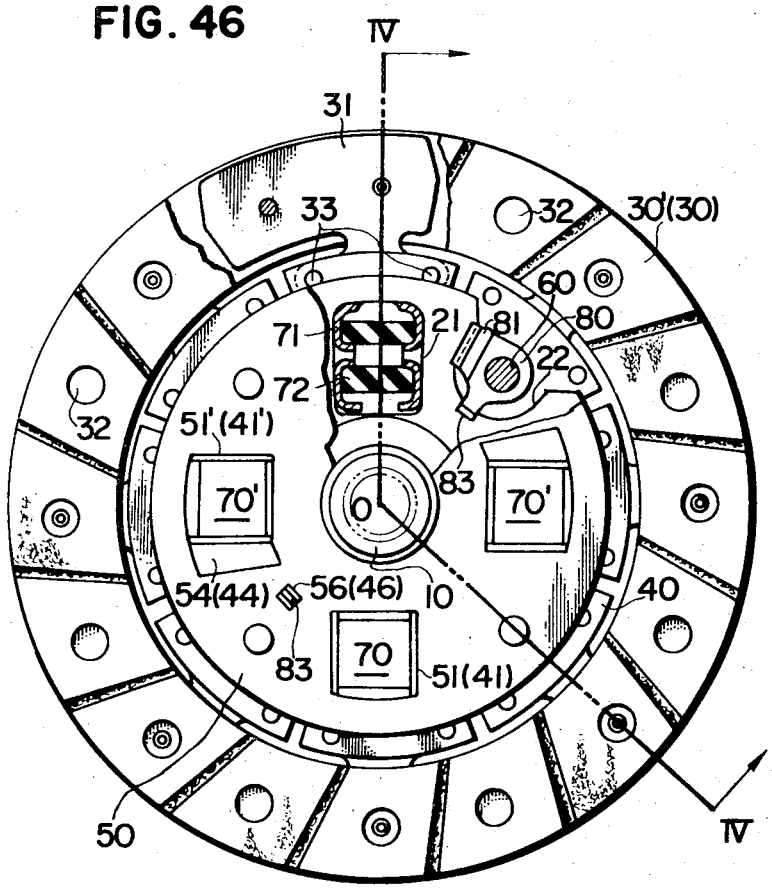
FIG. 46 is a plan view of the eleventh embodiment of this invention.
Figure 47:
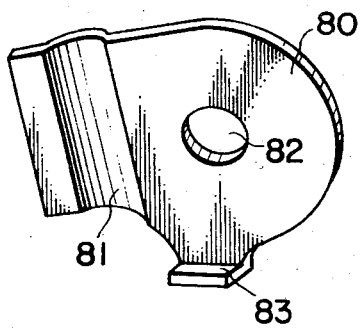
FIG. 47 is an enlarged partial view of the embodiment of FIG. 46.

The eleventh embodiment illustrated in FIG. 46 is a more compact and practical method, whose friction damper member 80 is illustrated in FIG. 47 in an enlarged manner. The construction of this damper is the same as the eighth through tenth embodiments. Namely, this embodiment is provided with one projection 81 which is brought into contact with the flange notch 22 at the time of acceleration. Moreover, this damper member 80 is provided with a hole 82 into which is inserted the stopper pin 60 for integrally attaching said damper to the plates 40 and 50 of the driving member. Furthermore, said damper member 80 is provided with a bent portion 83 which is fitted into holes 46 and 56 newly made on the plates 40 and 50. The operation of said eleventh embodiment is the same as the eighth embodiment.

The damper members 70' are mounted in openings 21 of flange 20, and disc plate 40 and subdisc plate 50 have openings 51' (41') corresponding to openings 21. The circumferential dimension of openings 51' (41') is larger to the left of damper member 70', the side that becomes effective during deceleration, than the similar dimensions of flange openings 21, thereby providing spaces 54 (44) having an angular travel space (Z) which are larger than the torsional angular displacement ($\theta$) developed as the stopper torque occurring when stopper pins 60 contact flange apertures 22. Hence, during deceleration, damper members 70' remain ineffective while damper members 70 are effective, thereby reducing the torsional stiffness to about half that encountered during acceleration. The combined abilities to increase the friction during acceleration and decrease torsional stiffness during deceleration contribute to the reduction of noise in such systems.

As described above, this invention has been achieved by paying attention to the facts that the torsional vibration of the power plant-drive line system is closely related with the friction characteristics of the clutch disc, and that the magnitude of its frictional force is closely associated with the vibration sound characteristics in a vehicle (booming sounds, rattling sounds of transmission gears, etc.) and further that it is very important to control the magnitude of this frictional force. This invention resides in controlling the frictional force by decreasing the friction between the driving and driven members significantly in accordance with the relative torsional angular displacement between said two members at the time of torque transmission when noise in a vehicle becomes excessive due to the friction between these two members. Thus, this invention makes it possible to effectively and fundamentally reduce noise in a vehicle by a mechanism of very simple construction.

The effects of this invention are illustrated in FIGS. 48 and 49. In these figures, the words "small friction clutch disc" should be understood to mean conventional clutch discs having no friction damper member. The words "large friction clutch disc" should be interpreted to mean conventional clutch discs having friction damper members of constant torque. As is apparent from FIGS. 48 and 49, noise in a vehicle is greatly reduced.

Furthermore, in the first through seventh embodiments, the damper seats 71 of the conventional construction are employed without any modification. In the eighth through tenth embodiments, the flange apertures 22 of the conventional construction are utilized without modification. Consequently, no other projection than said projection 81 is required to be provided on the driving or driven member, thus making the construction of the clutch disc very compact. However, it is of course possible to provide projections on each of the driving and driven members so that they can be brought into contact.

In the second through seventh embodiments, the friction member 90 should not necessarily be provided. Moreover, the member 80 having the projection 81 (friction damper member) should not necessarily be provided on both sides.

Having fully understood the technical concepts of the above-described embodiments, this invention may be practiced otherwise by combining said embodiments to provide more effective methods.

What is claimed is:
1. An automotive clutch disc comprising:
a driven member comprising a clutch hub fitted onto a rotating shaft, said hub having a flange integrally defined at the outer circumference of said hub, said flange having a plurality of openings therein;
a driving member coaxial with said driven member, comprising a disc plate and a sub-disc plate, each having openings therein corresponding to the openings in said flange, and said disc plate having clutch facings mounted thereon, said plates being located adjacent said flange one on each side thereof, and said plates being connected by stopper pins; said flange also having apertures in the edge thereof corresponding to the locations of said stopper pins;

damper members interposed between said plates in the openings in said flange for connecting and developing friction between said driven and driving members; and friction members interposed between said plates and said flange and connected to said driving member by said stopper pins and a key portion of said friction members which fits into a corresponding keyhole opening in one of said plates, said friction members having a projection for frictionally engaging said flange at said apertures thereby engaging said driven and said driving members, said friction members releasably contacting and thereby controlling the friction between said driven and driving members by frictional association of said projections and said flange at said apertures at predetermined relative torsional angular displacements between said driven and driving members, thereby reducing the noise in an automotive vehicle due to excessive friction between said driven and driving members.

* * * * *